United States Patent Office 3,380,503
Patented Apr. 30, 1968

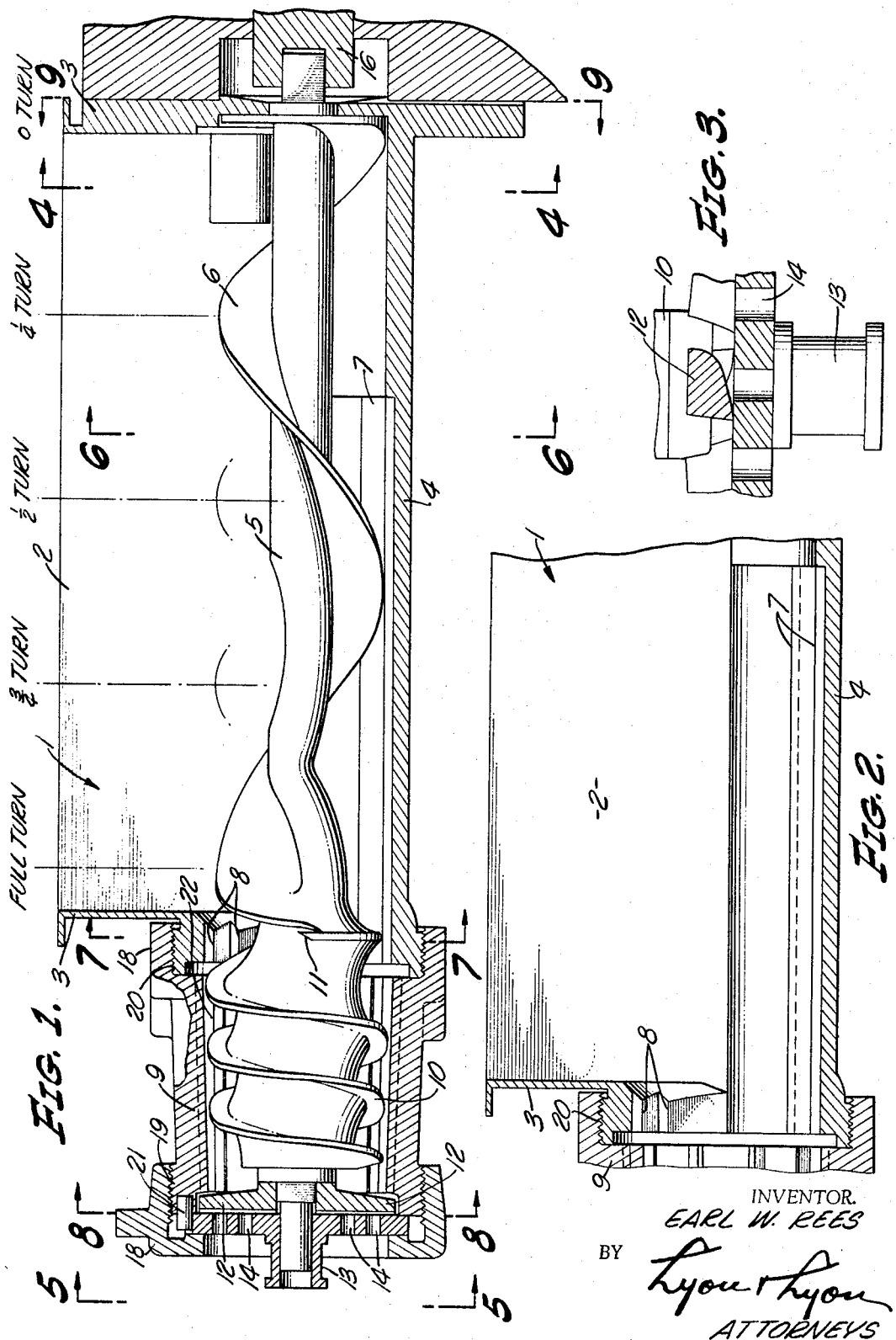

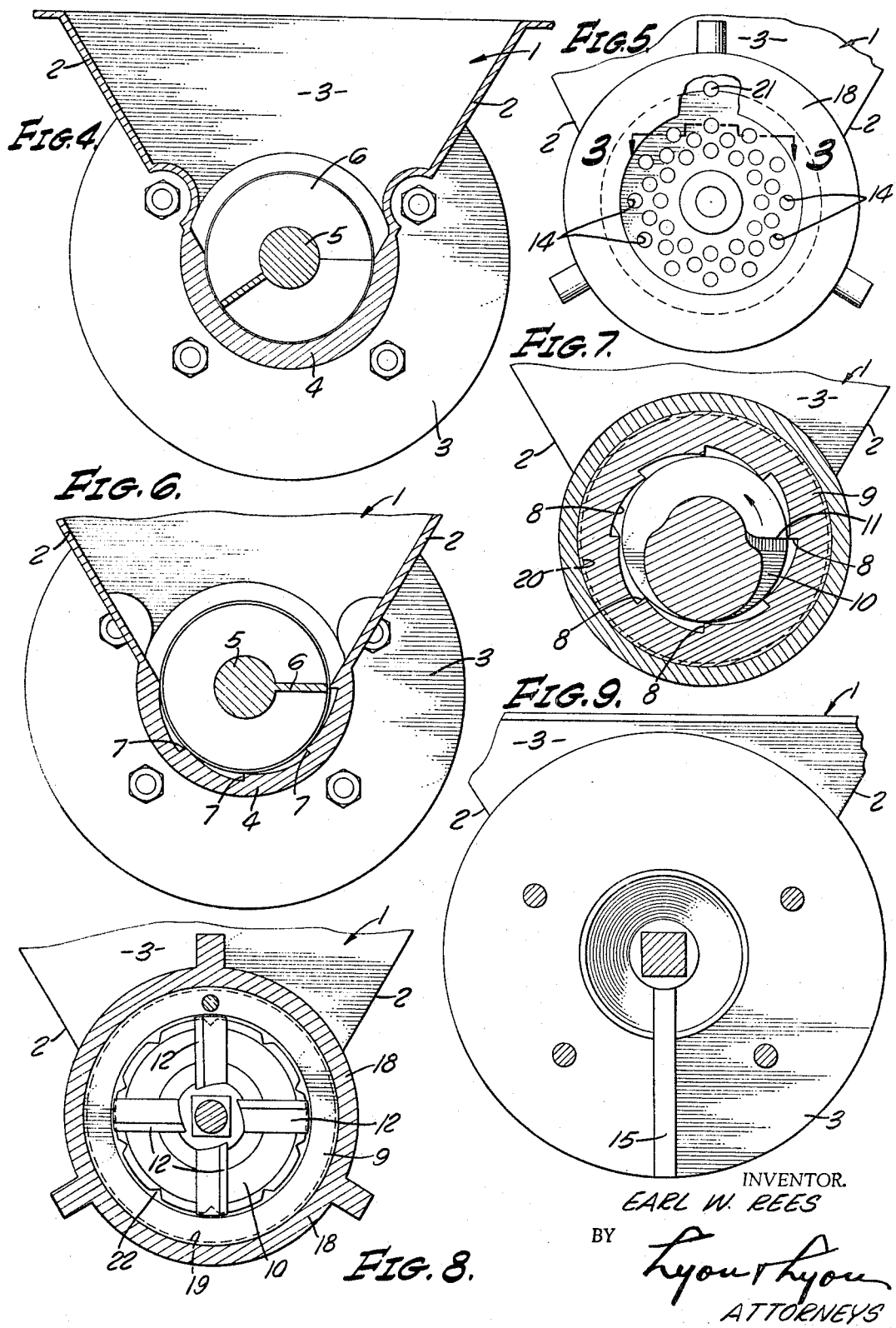

3,380,503
MEAT GRINDER
Earl W. Rees, 12110 Shoemaker Ave.,
Whittier, Calif. 90605
Filed Mar. 31, 1965, Ser. No. 444,317
2 Claims. (Cl. 146—189)

ABSTRACT OF THE DISCLOSURE

The meat hopper has cutting splines in the bottom thereof positioned only in the forward three-quarters, the rear one-quarter being free of splines. The neck portion which is attached to the forward discharge end of the hopper is provided on its inner surface with tapered cutting splines which converge from the end of the neck portion adjacent the hopper toward the other end of the neck portion, these splines being interrupted by a gap. A sharp cutting blade rotatably mounted in the hopper comprises substantially one revolution of its length. A grinding spline carried by the forward end of the cutting blade shaft cooperates with the cutting splines in the neck portion, the end of the grinding spline adjacent to the cutting blade extending in a radial direction and having a sharp cutting edge.

---

This invention relates to meat grinding apparatus and more particularly to improvements in the cutting worm of such grinders. When it becomes desirous to grind large pieces of meat, for example, pieces of meat weighing from fifty to one hundred-fifty pounds, in the ordinary meat grinder, these pieces must first be cut into smaller pieces and then fed into the hopper and ground.

The present invention contemplates a large and specially designed worm cutter which is so engineered to handle pieces of meat of the aforementioned size.

The principal object of the present invention is to provide an apparatus which will grind large pieces of meat.

Another principal object of the present invention is to provide an efficient high speed meat grinder.

A further object of the present invention is to provide a meat grinder which can grind up to six hundred pounds of meat per minute.

Another object of the present invention is to provide a high speed, efficient meat grinder which does not develop excessive heat.

A still further object of the present invention is to provide a worm cutter blade which can move any size piece of meat forward during each one-quarter of a revolution of the worm cutter.

A still further object of the present invention is to provide a worm cutter which cuts the meat into successively smaller pieces with each one-quarter revolution of the worm cutter.

Another object of the present invention is to provide a cutting blade which makes one revolution over the entire length of the worm cutter.

These and other objects and advantages of the invention will become apparent from the following detailed description, taken with the accompanying drawings, wherein:

FIGURE 1 is a cutaway side view of the hopper and cutting worm.

FIGURE 2 is a proportional cutaway side view of the hopper with the cutting worm removed.

FIGURE 3 is a cross-sectional view of the head piece and is taken through line 3—3 of FIGURE 5.

FIGURE 4 is a cross-sectional view taken through 4—4 of FIGURE 1.

FIGURE 5 is a cross-sectional view taken through 5—5 of FIGURE 1.

FIGURE 6 is a cross-sectional view taken through 6—6 of FIGURE 1.

FIGURE 7 is a cross-sectional view taken through 7—7 of FIGURE 1.

FIGURE 8 is a cross-sectional view taken through 8—8 of FIGURE 1.

FIGURE 9 is a cross-sectional view taken through 9—9 of FIGURE 1.

Referring now to FIGURE 1, the meat to be cut is placed in the hopper 1 which comprises sides 2 and end pieces 3 and a bottom portion 4. Mounted inside of the hopper 1 is a cutting worm shaft 5 which carries a cutting blade 6. This cutting blade 6 makes substantially one revolution over the entire length of the cutting worm 5. This blade 6 is designed to cut and move forward any size piece of meat per each one-quarter revolution of the worm shaft 5. The blade 6 cuts the meat into large segments which follow the worm 5 along its length per each one-quarter revolution and keeps moving the larger pieces of meat in position for the next quarter revolution. Cutting splines 7 are positioned in the bottom 4 of the hopper 1 and extend only part way toward the back of the hopper 1. As the cutting worm shaft 5 turns, it moves the meat against these splines and again cuts the meat per each one-quarter revolution of the cutting worm shaft 5. As the meat is moved along these splines by the cutting blade 6, it next enters the neck portion 9 of the device and encounters cutting splines 8 which are circumferentially about the neck portion 9. Located in the neck portion 9 is a grinding spline 10 which begins with a sharp cutting edge 11. This grinding means further grinds the meat in combination with the splines 8 and forces the ground meat forward into the final cutting blades 12. At the opening of the machine is a head piece 13 which contains orifices 14 through which the ground meat flows on to a conveyor belt.

FIGURES 1 and 9 show the end piece 3 and a drive spindle 16 to which is attached a suitable motor (not shown) to rotate the cutting worm shaft 5. A drainage means 15 is provided for the removal of blood and other juices.

The entire mechanism can be readily disassembled for cleaning purposes by removal of cap portion 18 which is attached to the neck portion 9 by means of threads 19 and removal of the neck portion 9 which is attached to the hopper 1 by means of threads 20. By so disassembling the frontal portion of the mechanism, the entire cutting worm may be slid forwardly and removed.

The beginning of the splines 8 in the neck portion of the mechanism are tapered. These splines are interrupted by a gap 22 and then continued on into the neck portion.

While the preferred embodiments of the invention have been illustrated and described herein, the invention is not to be construed as limited to the specific details disclosed herein, except as included in the following claims.

I claim:

1. A meat grinder comprising a hopper, a driving means for driving a cutting worm shaft mounted in said hopper, a sharp cutting blade comprising substantially one revolution over the length of said cutting worm shaft, cutting splines in said hopper, said splines being positioned only in the forward three-quarters of the hopper so that meat to be ground is forced against said splines after the first one-quarter revolution of said cutting worm shaft, a neck portion connected at one end to the forward end of the hopper, a grinding spline disposed immediately forward of said cutting blade and carried by the worm shaft and extending into the neck portion of said meat grinder, tapered cutting splines in said neck portion converging from said one end toward the other end of the neck portion, said grinding spline having a generally radially extending sharp cutting edge at the end thereof adjacent to said cutting blade, and a final cutting blade which further cuts the meat and forces said meat out of said meat grinder through orifices located in the head piece.

2. A meat grinder according to claim 1 wherein an annular gap interrupts said cutting splines intermediate the opposite ends thereof.

References Cited

UNITED STATES PATENTS

| 348,132 | 8/1886 | Leopold | 146—187 |
| 2,216,023 | 9/1940 | Schmidt | 146—189 |
| 3,132,680 | 5/1964 | Schill et al. | 146—186 |

W. GRAYDON ABERCROMBIE, *Primary Examiner.*

WILLIAM W. DYER, Jr., *Examiner.*